United States Patent [19]

Naito

[11] Patent Number: 4,545,445
[45] Date of Patent: Oct. 8, 1985

[54] SPAN ADJUSTING SYSTEM OF ELECTRONIC WEIGHING APPARATUS

[75] Inventor: Kazufumi Naito, Ohtsu, Japan

[73] Assignee: Kabushiki Kaisha Ishida Koki Seisakusho, Kyoto, Japan

[21] Appl. No.: 628,305

[22] Filed: Jul. 6, 1984

[30] Foreign Application Priority Data

Jul. 7, 1983 [JP] Japan .................................. 58-124508
Jul. 8, 1983 [JP] Japan .................................. 58-125241
Jul. 11, 1983 [JP] Japan .................................. 58-126585

[51] Int. Cl.[4] ..................... G01G 23/22; G01G 19/52; G01G 23/14; G01L 25/00
[52] U.S. Cl. ........................................ 177/25; 177/50; 177/164; 364/567; 364/571
[58] Field of Search ........................... 177/25, 50, 164; 364/567, 571

[56] References Cited

U.S. PATENT DOCUMENTS

4,080,657  3/1978  Caldicott et al. ............... 364/571 X
4,310,893  1/1982  Loshbough ....................... 177/50 X
4,316,518  2/1982  Jonath ................................ 177/25
4,417,631 11/1983  Johnson ......................... 364/567 X Primary Examiner—George H. Miller, Jr.
Attorney, Agent, or Firm—Staas & Halsey

[57] ABSTRACT

There is provided a system for adjusting the span of an electronic scale having a double-integrating A/D converter for converting a weight signal into a digital signal. The double-integrating A/D converter has a software-implemented timer for controlling a primary integrating time. The operation time of the software-implemented timer is adjusted linearly or in steps so that a digital value at the time a weight is placed on the scale-pan of the scale will correspond to the weight. The adjustment of the operation time of the software-implemented timer is utilized to adjust the differences between gravitational accelerations corresponding to different weights in geographical areas on the earth.

11 Claims, 11 Drawing Figures

SPAN ADJUSTING SYSTEM OF ELECTRONIC WEIGHING APPARATUS

CROSS REFERENCE TO RELATED APPLICATION

This application is related to U.S. Ser. No. 580,690 filed Feb. 16, 1984.

BACKGROUND OF THE INVENTION

The present invention relates to a system for adjusting the span of an electronic weighing apparatus or scale, and more particularly to an electronic scale span adjusting system capable of easily and accurately correcting the span of an electronic scale according to a variation in an output voltage from a weight sensor.

Figure 1:
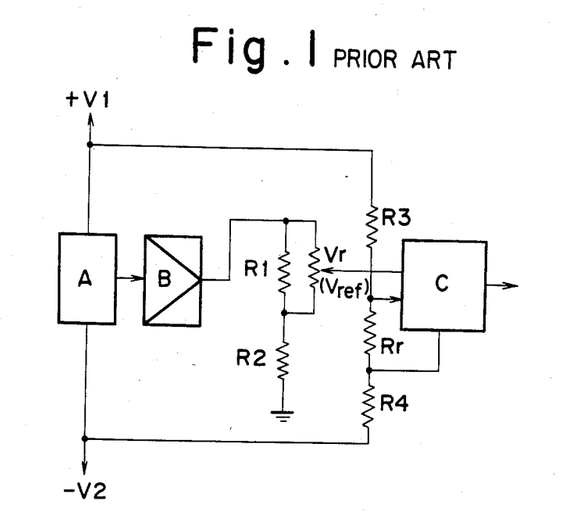
FIG. 1 is a block diagram of a span adjustment circuit in a conventional electronic weighing apparatus.

FIG. 1 of the accompanying drawings is a span adjustment circuit in a conventional electronic scale.

Designated in FIG. 1 at A is a weight sensor comprising a load cell, B is an amplifier for amplifying an output voltage from the weight sensor A, R1 and R2 are voltage-dividing resistors for dividing an output from the amplifier B, C is an A/D converter of the double-integrating-type, and Vr is a variable resistor having input terminals connected across the voltage-dividing resistor R1 and an output terminal to an input terminal connected of the A/D converter C.

The variable resistor Vr has a resistance selected to be much larger than that of the voltage-dividing resistor R1 so that any variation in the resistance of the variable resistor Vr in the combined resistance of the same and the resistance of the voltage-dividing resistor R1 will be reduced. The A/D converter C has a reference voltage input terminal supplied with a voltage obtained by suitably dividing a voltage (V1+V2) imposed on the weight sensor A through voltage-dividing resistors R3, Rr and R4 for achieving tracking with respect to the weight sensor A. The span of the scale can be adjusted by operating the variable resistor Vr.

As is well known, the resistance of the variable resistor Vr is liable to vary due to vibrations, temperature changes, and time. Even with the circuit arrangement of FIG. 1 in which any variation in the resistance of the variable resistor Vr is reduced, the span of the scale is subjected to changes due to a variation in the resistance of the variable resistor Vr. To place such a span change in an allowable range, the range of adjustment achieved by the variable resistor Vr should be reduced to make negligible any influence by variations in the resistance of the variable resistor Vr. However, since the rated output voltage from the weight sensor A suffers a considerably wide variation, the scale span adjustment is sometimes impossible to make if the variable range of the variable resistor Vr is reduced.

It has been conventional practice to change the reference voltage in the A/D converter C, dependent on the output voltage from the weight sensor A, to put any scale span change in an allowable range. Such a change in the reference voltage however requires the selection, soldering attachment, and replacement of the voltage-dividing resistors R3, Rr and R4, and hence the efficiency of connecting such resistors has been low and the cost of manufacture has been high.

It is well known in the art that the scale span is affected by the gravitational acceleration of the earth. Therefore, where the spans of electronic scales, to be used in geometrical areas subjected to different gravitational accelerations, are to be adjusted in a manufacturer's factory, it is necessary for the manufacturer to have many weights for the areas (hereinafter referred to as "area weights"). That is, the manufacturer must take into account the gravitational accelerations of each area, for respective weighing capacities. In the span adjustment, the area of use should be confirmed for each scale in selecting the area weight for that scale.

Accordingly, it has been quite tedious and time-consuming for the manufacturer to make the span adjustment for each area. When areas of use are changed due to a variation in the market demand, the span has to be adjusted again. Therefore, such a change in areas of use has been a tremendous burden on the part of the manufacturer. The cost of keeping the various area weights in inventory has also been a great burden on the manufacturer.

SUMMARY OF THE INVENTION

It is an object of the present invention to provide a system capable of easily adjusting the span of an electronic weighing apparatus or scale without the need for selection of a voltage-dividing ratio of voltage-dividing resistors which change the reference voltage of an A/D converter.

Another object of the present invention is to provide a system for adjusting the span of an electronic scale to make the electronic scale highly reliable without suffering a span change due to a shifted setting position.

Still another object of the present invention is to provide a system for allowing persons having no experience and skill to adjust the span of an electronic scale simply, accurately, and speedily.

A still further object of the present invention is to provide a system capable of adjusting the span of all electronic scales desired with a reference weight without using area weights corresponding to the gravitational accelerations of areas in which the scales are to be used, and thereafter entering the indicated areas for the scales as input data so as to effect span adjustment reliably for each area.

According to the present invention, there is provided a system for adjusting the span of an electronic scale comprising a double-integrating A/D converter, a control unit with a software-implemented timer for controlling an integrating time to integrate a weight signal, and a setting means for applying a signal to change an operation time of the software-implemented timer in steps to the control unit. The system may additionally include a variable resistor for continuously adjusting a reference voltage of the A/D converter or an input voltage indicative of the weight signal.

With the span adjusting system for an electronic weighing apparatus or scale, the span adjustment of the scale for compensating for a variation in the output voltage from a weight sensor can roughly be made by adjusting the setting means, and then finely be made by continuously adjusting the variable resistor. The span of the scale can therefore be adjusted accurately and easily. The conventional process of replacing voltage-dividing resistors and attaching replaced voltage-dividing resistors by soldering can be dispensed with, the adjusting procedure can be improved, and the cost of manufacture can be reduced.

Since the rough span adjustment can be achieved by a DIP switch, the adjustment can be made with utmost ease. Because the scale span is adjusted not on an analog basis but on a digital basis, a ratio of adjustment in which an output value from the A/D converter can be increased to a certain count can be obtained simply, accurately, and speedily by those who have no skill and experience.

Further according to the present invention, there is provided a system for adjusting the span of an electronic scale having a double-integrating A/D converter for converting a weight signal into a digital signal, the apparatus including a control unit having a software-implemented timer for controlling a primary integrating time of the double-integrating A/D converter, the operation time of the software-implemented timer being adjusted so that a digital display value at the time a weight is placed on the scale will be indicative of the weight of the weight.

Still further, according to the present invention, there is provided a system for adjusting the span of an electronic scale having a double-integrating A/D converter for converting a weight signal into a digital signal, the apparatus including a display means for displaying a digital signal produced by the A/D converter, a control unit having a software-implemented timer for controlling a primary integrating time of the A/D converter, and an adjusting means for adjusting the operation time of the software-implemented timer.

Yet further, according to the present invention, there is provided a system for adjusting the span of an electronic scale having a double-integrating A/D converter for converting a weight signal into a digital signal, the apparatus including a memory for storing a digital value indicative of the weight of a weight, a control unit having a software-implemented timer for controlling a primary integrating time of the A/D converter and an adjusting means for reading the digital value from the memory, comparing the read digital value with an output value from the A/D converter at the time the weight is placed on the scale, and adjusting the operation time of the software-implemented timer so that the compared values will be equal to each other, and a span command switch for commanding operation of the adjusting means.

With the above span adjusting system, the span of the scale can be adjusted by a DIP switch or a digital switch capable of fixing a setting position at a 0 digital value. As the set value is thus stabilized, the electronic scale is highly reliable in operation. Since the output voltage from the A/D converter can be adjusted not on an analog basis but on a digital basis, a ratio of adjustment in which the output value of the A/D converter can be incremented by 1 can easily be grasped. Therefore, span adjustment can be carried out simply, accurately, and speedily by those who have no skill and experience. Furthermore, the automatic span adjustment of a scale saves much labor which has conventionally been expended in a time-consuming and tedious span adjustment.

Still, according to the present invention, there is provided a scale for adjusting the span of an electronic scale including a double-integrating A/D converter having a software-implemented timer for controlling an integrating time to integrate an input signal, a control unit having a control means for controlling the operation time of the software-implemented timer, a memory for storing operation times of the software-implemented timer corresponding to respective gravitational accelerations, and an area indicating means for indicating areas corresponding to the operation times stored in the memory and issuing the indicated areas to the control means.

With the above span adjusting system, the span adjustment of the scale for an indicated area can be made without using an area weight corresponding to the gravitational acceleration of the area of use. More specifically, by initially effecting a span adjustment using a reference weight, the span adjustment for an indicated area can automatically be performed simply by entering the indicated area as input data to the scale. As a consequence, it is not necessary to make span adjustments for individual areas using their area weights, and hence the span adjustment operation can efficiently be carried out by the manufacturer. As there is no need for the manufacturer to have area weights prepared for respective areas of use, the cost of keeping the weights, which would otherwise be required, is eliminated. Areas of use can easily be changed due to variations in the market demands in the areas, so that such market demand variations can easily be dealt with.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 2:
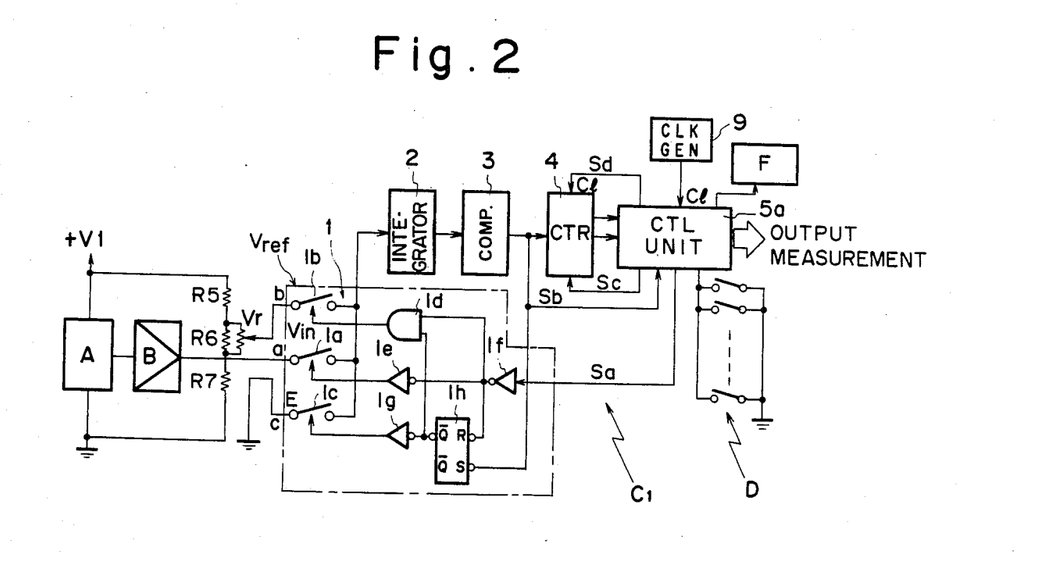
FIG. 2 is a block diagram of a span adjusting system according to an embodiment of the present invention.

FIG. 2 shows, in block form, the essential parts of an electronic weighing apparatus or scale. The electronic scale generally includes a weight sensor A comprising a load cell, an amplifier B for amplifying an output signal from the weight sensor A, and a double-integral A/D converter $C_1$ for converting an analog value of an output signal from the amplifier B into a digital value.

The double-integrating A/D converter $C_1$ has at an input terminal thereof an analog switch 1 for selecting one of three input signals, that is, a reference voltage (Vref), an analog signal (Vin) indicative of a measured value, and a ground voltage E, the analog switch 1 having an output terminal connected to an input circuit of an integrator 2. The analog switch 1 comprises three switching elements 1a, 1b and 1c composed of functional elements such as FETs, an AND gate 1d for driving the switching elements, inverters 1e, 1f and 1g, and a flip-flop (hereinafter referred to as an "FF") 1h. The integrator 2 serves to integrate an analog voltage applied from the analog switch 1 for a prescribed interval of time and issue an output signal to a comparator 3. The comparator 3 issues a count stop signal Sb when the output voltage from the integrator 2 reaches an initial integration starting voltage (normally zero V). (Actually, the output signal from the comparator 3 is a low level when the input signal is zero, and is a high level when the input signal is other than zero, the count stop signal Sb being indicative of a variation from the high level to the low level.) A counter 4 is connected to an output terminal of the comparator 3. The counter is reset by a reset command Sc from a control unit 5a (described later) at the start of an inverse integration process, and simultaneously starts a counting operation. The counting operation stops in response to the count stop signal Sb from the comparator 3. The counter 4 comprises a modulo-2 counter. To allow the counter 4 to count a signal beyond its capacity, the control unit 5a counts each overflow of the counter 4, and when the counting operation of the counter 4 is finished, a total output count from the counter 4 is calculated from an output count of the counter 4 and the number of overflows is counted by the control unit 5a. The calculated total output count is issued as an output count from the A/D converter $C_1$ to a main control apparatus (not shown) which controls the overall electronic scale. It may be possible for the control unit 5a to control the overall scale.

The counter 4 is supplied from the control unit 5a with count pulses Sd in synchronism with one command cycle of a program contained in the control unit 5a.

Figure 3:
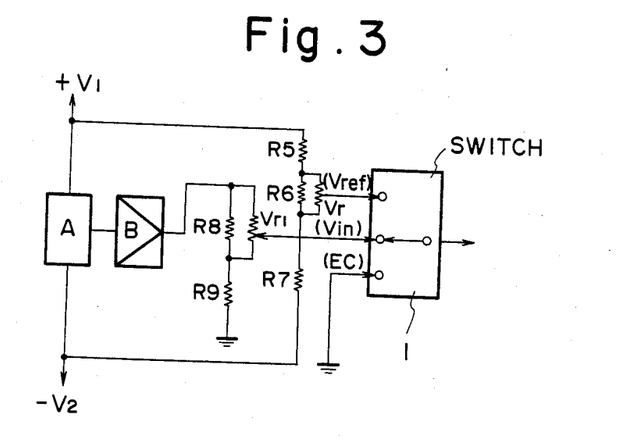
FIG. 3 is a block diagram of a span fine adjustment means for an electronic weighing apparatus according to another embodiment of the present invention.

FIG. 3 is an arrangement for effecting fine adjustment of the span. Identical parts in FIG. 3 are denoted by identical reference characters in FIG. 2 and will not be described in detail. According to the embodiment of FIG. 3, an output voltage from the amplifier B is divided by voltage-dividing resistors R8 and R9, and a variable resistor Vr1 is connected in parallel to the resistor R8 for adjusting an input voltage Vin applied to the analog switch 1 of the double-integrating A/D converter so as to effect fine adjustment of the span.

The control unit 5a is in the form of a microcomputer composed of a central processing unit, a program memory, a working memory, and an input/output circuit. The control unit 5a is supplied with the count from the counter 4 and the count stop signal Sb from the comparator 3 for issuing a switching command Sa, the reset command Sc and also a measurement signal of a digital value obtained by integrating the analog signal Vin which is indicative of a weighed value in accordance with a program stored in the program memory. The control unit 5a also has a software-implemented timer for issuing, as a specified timing, the switching command Sa which controls a primary integration time to integrate the analog signal Vin applied as an input signal to the A/D converter $C_1$. The adjustment of operation time of the software-implemented timer, or the span adjustment, is effected by a setting means D for changing operation times of the software-implemented timer in a steplike manner.

The setting means D may comprise a DIP switch, for example. When the setting means D is composed of a 4-bit DIP switch, it can adjust the span adjustment in 16 steps. Designated in FIG. 2 at F is a display unit for displaying a weight value issued from the control unit 5a.

The operation time of the software-implemented timer is generally given by the number of times of repetition of a process (such as a non instruction process) in which one command cycle is constant. The setting means D is arranged, for example, to adjust, in one step, the operation time corresponding to 250 command cycles.

The counter 4 effects counting operation in synchronism with one command cycle as described above. Where an adjustment is made in which a primary integration time T1 and a secondary integration time T2 are substantially equal at the time a weight corresponding to a weighing capacity is placed on the scale, as in FIG. 4 which shows the operation characteristics of the double-integrating A/D converter, one-step adjustment of the setting means D can adjust 250 counts of the output from the A/D converter.

With the span adjustment process according to the above embodiment, a rough span adjustment is first made by the setting means D, and then a final fine adjustment is effected by the variable resistor Vr shown in FIG. 3. More specifically, a zero adjustment of the scale is first performed by adjusting the balance of a bridge circuit in the weight sensor A, then a weight corresponding to the weighing capacity is placed on the scalepan, and the setting means D and the variable resistor Vr1 are operated to adjust the scale span so that a weight value displayed at this time will be equalized to the weight (a count corresponding to the weight of the weight or the weight value of the weight) of the weight placed on the scalepan.

Fine adjustment of the span can be performed by varying the reference voltage with the variable resistor Vr. In a scale in which the primary and secondary integration times T1 and T2, at the time the weight corresponding to the weighing capacity is placed on the scale, are substantially equal (that is, the input voltage Vin to the A/D converter and the reference voltage Vref are equal when the weight corresponding to the weighing capacity is placed on the scale), the secondary integration time T2 is increased by a time period 2 m Ts when the operation time of the software-implemented timer contained in the control unit 5a is increased by a time period 2 m Ts which is required to execute as many commands as possible in 2 m steps. Since the counter 4 counts each command cycle Ts, the counter 4 produces an output which is increased by 2 m counts. In a scale in which the primary and secondary integration times T1 and T2, at the time the weight corresponding to the weighing capacity is placed on the scale are selected to be $T1'=2\times T2$, the secondary integration time T2 is increased by a time period m Ts when the operation time of the software-implemented timer is increased by a time period 2 m Ts which is required to execute as many commands as possible in 2 m steps. As a consequence, the count output from the counter 4 is increased by m counts.

Thus, in a scale in which the primary and secondary integration times T1 and T2, at the time the weight corresponding to the weighing capacity is placed on the scale, are selected to meet at least the relationship $T1 \geq T2$, the count of the counter 4 can be increased by an integer N, which is expressed below as:

$$N \leq n(T2/T1) < (N+1)$$

when the primary integration time T1 is increased by a time period T1 corresponding to n steps.

With the embodiment shown in FIG. 2, the scale is first subject to a zero adjustment, then a reference weight is placed on the scalepan, and finally the operation time of the software-implemented timer is varied with the setting means D for span adjustment of the scale so that a weight value displayed at that time (when the displayed value at the time of no load is not zero, an output value from the A/D converter from which the displayed value is subtracted, or such an output value as converted into a weight value) will be equalized to the weight of the placed weight (a count corresponding to the weight of the weight placed on the scale).

Figure 5:
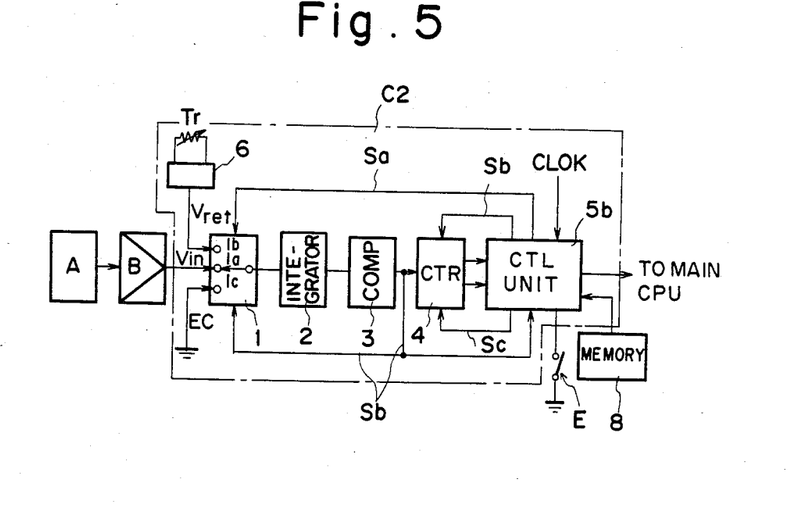
FIG. 5 is a block diagram of a span adjusting system according to another embodiment of the present invention.

FIG. 5 is a block diagram of essential components of an electronic scale in which the operation of a software-implemented timer is automatically adjustable. Identical parts in FIG. 5 will be denoted by identical reference characters in FIG. 2 and will not be described in detail.

A span adjusting system shown in FIG. 5 includes a memory 8 for storing a digital value indicative of a weight corresponding to a weighing capacity, an adjusting means, as described above, (which is not shown, but can be achieved by executing steps in a flowchart described later) for reading the digital value from the memory 8 in response to a span adjustment command, comparing the read digital value with an output from an A/D converter $C_2$ at the time the weight corresponding to the weighing capacity is placed on the scale, and adjusting the operation time of a software-implemented timer so that the compared values will be equal to each other, and a span command switch E for commanding operation of the adjusting means, whereby the span of the scale can automatically be adjusted.

The memory 8 stores 10,000 counts as the digital value such that its weighing capacity is 2 kg and five counts of the output from the A/D converter correspond to 1 g. However, the count storage is based on the assumption that the place in which the span of the scale is adjusted and the place in which the scale is used belong to the same geographical area. Where a different area of use is intended, the memory 8 stores a digital value indicative of a span taking into consideration the gravitational acceleration in the area, for example, 9985 counts for Hokkaido, 10,000 counts for Tokyo, and 10,015 count for Okinawa. A control unit 5b has an area indicating means (not shown) for reading the digital value representative of the area in which the scale is to be used. The span of the scale should be adjusted by the read digital value for the area of use.

Figure 6:
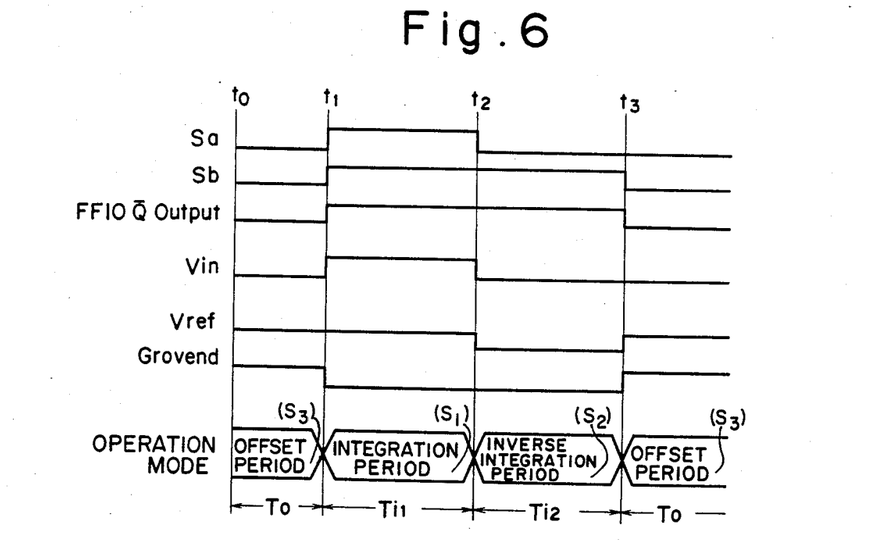
FIG. 6 is a timing chart of the operation characteristics of a double-integrating A/D converter.

The integrating operation of the double-integrating A/D converter will be described with particular reference to the analog switch 1 (as shown also in FIG. 2). The analog switch 1a is controlled by a switching signal Sa from the control unit 5b and a count stop signal Sb from the comparator 3. As shown in FIG. 6, an offset of the zero point of the integrator 2 is compensated for in an offset period To including a time $t_0$. In the offset period $T_0$, the FF 1h is set and $\overline{Q}$ and Q terminals thereof are at low and high levels, respectively. Since the output from the inverter 1g goes high, the switching element 1c is turn on to apply the ground voltage E to the double-integrating A/D converter. The double-integrating A/D converter is now in an offset period $S_3$.

When the switching command Sa is issued (indicating a transition from a low level to a high level) from the control unit 5b at a time $t_1$, the $\overline{Q}$ and Q terminals of the FF 1h go high and low, respectively. The output from the inverter 1g goes low to turn off the switching element 1c, and the output from the inverter 1e goes high to turn on the switching element 1a, whereupon an analog signal Vin is applied to the input terminal of the integrator 2 to enable the latter to start an integrating operation. The double-integrating A/D converter now enters a Vin integrating period $S_1$ at $Ti_1$. When the integrator 2 issues an analog signal as a result of its integrating operation, the output from the comparator 3 goes high. The operation of the double-integrating A/D converter remains unchanged if the signal Sb is changed from the low level to the high level.

At a time $t_2$ upon elapse of the time period $Ti_1$ (determined by a software-implemented timer, described later), the switching command Sa goes low and the output from the inverter 1e goes low, thus turning off the switching element 1a. The integrating operation on the input analog signal Vin is brought to an end. Since the output from the AND gate 1d goes high at the same time, the switching element 1b is turned on to apply the reference voltage Vref (a prescribed voltage having a polarity opposite to that of Vin) to the integrator 2 to enable the latter to effect an inverse integration in a period $S_2$.

At a time $t_3$, in which the output voltage from the integrator 2 becomes zero as a result of the inverse integration, the output from the comparator 3 is changed from the high level to the low level (this transition signal serving as the count stop signal Sb) to set the FF 1h. The Q output terminal goes low to cause the output of the inverter 1g to go high, thereby turning off the switching element 1c. As the ground voltage E is now imposed on the integrator 2, the operation of the double-integrating A/D converter enters an offset period again at a time $t_3$.

The above operation is repeated at a constant period of time according to a program stored in the control unit 5b. The program contains instructions for the operation sequence and times, that is, the period S1 and the integrating time $Ti_1$ for integrating the analog input signal Vin and the offset period $S_3$ and the offset time $T_0$. The integrating time $Ti_1$ for integrating the analog input signal Vin can be set to any desired value according to the value of the input signal. Thus, the control unit 5b has a software-implemented timer for varying the integrating time $Ti_1$ for integrating the analog input signal Vin.

Figure 7:
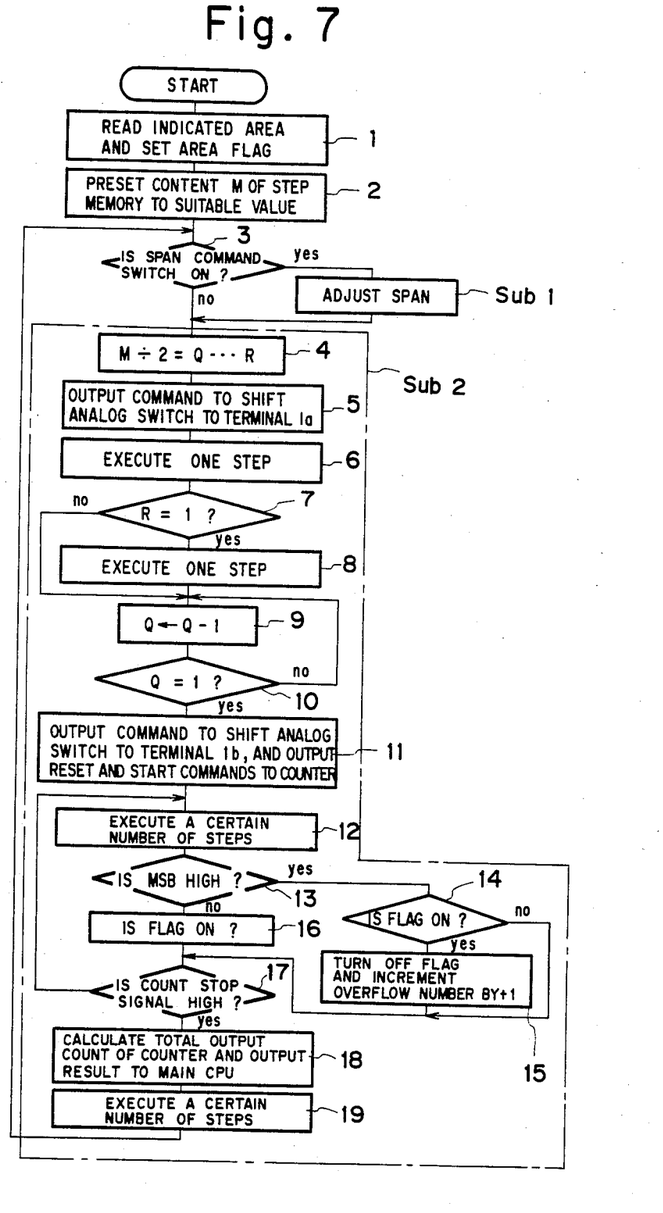
FIGS. 7 and 8 are flowcharts of the operation of the double-integrating A/D converter.

Operation of the embodiment of FIG. 5, taking into account the foregoing area adjustment, will now be described with reference to FIGS. 7 and 8.

For the sake of brevity, it is assumed that the zero point adjustment of the scale has already been completed. An example will be taken in which if the operation time of the software-implemented timer contained in the control unit 5b is adjusted to a time period corresponding to about ten thousand steps, then the output from the A/D converter corresponds to the weight of the weight placed on the scalepan when a count of ten thousand is reached.

The analog switch 1 has its contact connected to the terminal 1c at the time of initialization.

When the program is run, the control unit 5b reads an area of use as indicated by the area indicating means and sets up a flag corresponding to the indicated area in step 1. To determine the operation time of the software-implemented timer upon initialization, the control unit 5b presets a suitable value in a step memoery in step 2. The step memory is contained in the control unit 5b, and the number of steps M (a value to repeat one command process having a constant processing time M) stored in the step memory controls the operation time of the software-implemented timer.

Then, the control unit 5b determines whether the span command switch E is turned on or not in step 3. If the span command switch is on, then the program enters a span adjustment subroutine Sub1 (described later), and if not, then the program goes to the following A/D conversion process Sub2.

The A/D conversion process Sub2 is started by a step 4 in which the control unit 5b divides the stem number M, stored in the step memory, by 2 to determine the number Q of processing a loop composed of two steps (commands), described later. Indicated in step 4 at R is a remainder, which is R=0 when M is an even number and R=1 when M is an odd number.

Then, the control unit 5b issues a command Sa to shift the contact of the analog switch 1 from the terminal 1c to the terminal 1a in step 5. Now, an unknown input voltage starts being integrated (primary integration).

The control unit 5b executes a process corresponding to M steps in the process from step 6 to step 10 in order to operate the contained software-implemented timer. More specifically, the control unit 5b first executes a process corresponding to one step in the step 6, and then determines whether R=1 in step 7. If R=1, then is executed step 8, and if R=0, then step 8 is skipped, and the program goes to step 9. Thus, when M is an even number, two steps are executed in steps 6 and 7, and when M is an odd number, three steps are executed in steps 6 through 8. Then, the control unit 5b repeats the process of the loop, composed of two steps, (Q−1) times, whereupon the process corresponding to the M steps is substantially ended.

Upon completion of the above process, the control unit 5b issues a command Sa to shift the contact of the analog switch 1 the terminal 1b and also issues command Sc for resetting and starting to the counter 4 in a step 11. The integration of the unknown input voltage Vin is finished, and an inverse integration (secondary integration) of the reference voltage Vref and counting operation of the counter 4 are started.

In the period of the inverse integration (secondary integration), the control unit 5b checks whether the most significant bit (MSB) of the counter is high or low in a period shorter than half of the period in which the counter 4 reaches it full count, thus counting the number of overflows of the counter 4. More specifically, the control unit 5b gains time by executing a process composed of a number of steps in step 12 and then checks whether the MSB is high or low in step 13. Since the MSB in half of the period in which the counter 4 reaches its full count is low, the result of step 13 is NO, and a flag is rendered ON initially in step 16. Then, the control unit 5b checks whether the count stop signal Sb from the comparator 3 is high or low in step 17. If the count stop signal is high as a consequence of checking, then the program goes to step 18, and if low, the program returns to step 12. When half of the period in which the counter 4 reaches its full count elapses and the MSB changes from the low state to the high state, while the above loop process is repeated, the program goes from step 13 to step 14.

In step 14, the control unit 5b determines whether the flag is ON or not. If the flag is ON, it is rendered OFF in a succeeding step 15, and the number of overflows is incremented by +1, whereupon the program goes to step 17. Since the flag is OFF, if the program goes back to step 12 and proceeds from step 13 to step 14, step 15 is skipped during the half period in which the MSB is high, and the program goes to step 17.

The control unit 5b thus monitors the count stop signal Sb from the comparator 3 while counting overflows of the counter 4. When the count stop signal Sb is high, the inverse integration of the reference voltage Vref and the shifting of the contact to the terminal 1c are completed, and the control unit 5b calculates a total output count C of the counter 4 from the count of the counter 4 and the number of counted overflows in step 18. The control unit 5b then executes a process composed of a certain number of steps to gain time to compensate for an offset of the integrator 2 in step 19. The program now goes back to step 3.

If the span command switch E is depressed at this time, the control unit 5b enters the span adjustment subroutine Sub1.

Figure 8:
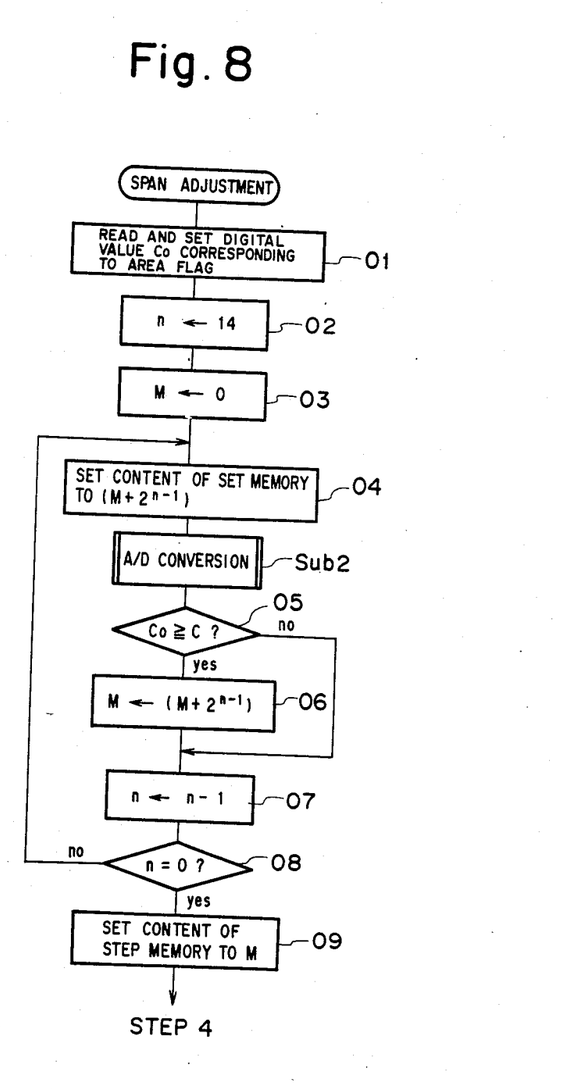

FIG. 8 is a flowchart of successive steps of the span adjustment subroutine Sub1. The illustrated process is the same as the process for determining a digital value corresponding to an unknown input in a so-called sequential comparison A/D converter. The control unit 5b reads a corresponding compensated digital value Co (10,000 counts for example), from the memory 8 in accordance with the preset area flag, and sets the digital value Co in a given register in step 01. The digital value Co serves as a target count which is to be issued from the A/D converter $C_2$.

Then, the control unit 5b sets n which is a multiple of 2 through 14, clears the content M of the step memory to 0, and sets a temporary value of $M+2^{13}=8192$ in the step memory in steps 02 through 04. The control unit 5b then executes a process corresponding to the step number (= 8192) during steps 6 through 10 of the foregoing A/D conversion process Sub2, whereby the operation time of the software-implemented timer is finished. The control unit 5b compares an output value C from the counter 4 in step 18 with the digital value Co or the target count in step 05. If the output value C of the counter 4 does not reach the digital value Co as a result of the comparison, then the operation time of the software-implemented timer is insufficient, and the control unit 5b renews the content M of the step memory to 8193 in step 06. Then, the control unit 5b decrements the n to 13, and goes through step 08 back to step 04. In step 04, $8192+2^{12}=12,288$ is set as a temporary value in the step memory. The control unit 5b then determines a count C of the counter 4 in the A/D conversion process Sub2, and compares it with the target count digital value Co in the next step 05. If the output value of the counter 4 exceeds the digital value Co as a consequence of the comparison, then the operation time of the software-implemented timer is excessive, and the process of step 06 is skipped and the above temporary value (12,288) is neglected. The program then goes through the steps 07, 08 back to step 04. The control unit 5b now sets $8192+2^{11}=10240$ as a temporary value in the step memory.

The above cycle is repeated by the control unit 5b until n becomes 0 while renewing the stored content M of the step memory. When n becomes 0, the output value C of the counter 4 is equal to the target count digital value Co, and hence the content M of the step memory is fixed in step 09 as 10,000, determined in step 06. The program then returns to the A/D conversion process Sub2. The span of the scale has now been adjusted.

Figure 4:
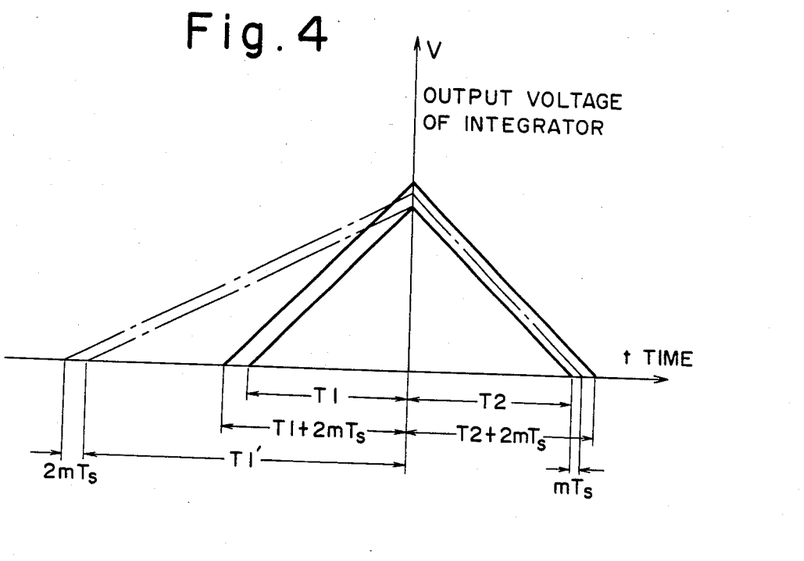
FIG. 4 is a diagram of the operation characteristics of a double-integrating A/D converter.

The above illustrated example is directed, for the sake of brevity, to a span adjustment in which the primary and secondary integrating times of the A/D converter are substantially equal to each other at the time a weight corresponding to a weighing capacity is placed on the scalepan. In general, however, the primary integrating time is selected as being longer than the secondary integrating time as shown in FIG. 4 and the output value of the counter 4 can be adjusted one count by adjusting the number of steps of the software-implemented timer. With such an arrangement, a complete span adjustment can be performed simply by adjusting the operation time of the software-implemented timer without adjusting the input voltage of the A/D converter and the like.

While in the above example the method of determining the operation time of the software-implemented timer is the same as that of determining the output value of a sequential comparison A/D converter, the present invention is not limited to such a method, but the operation time of the software-implemented timer can be determined by the following method.

Figure 9:
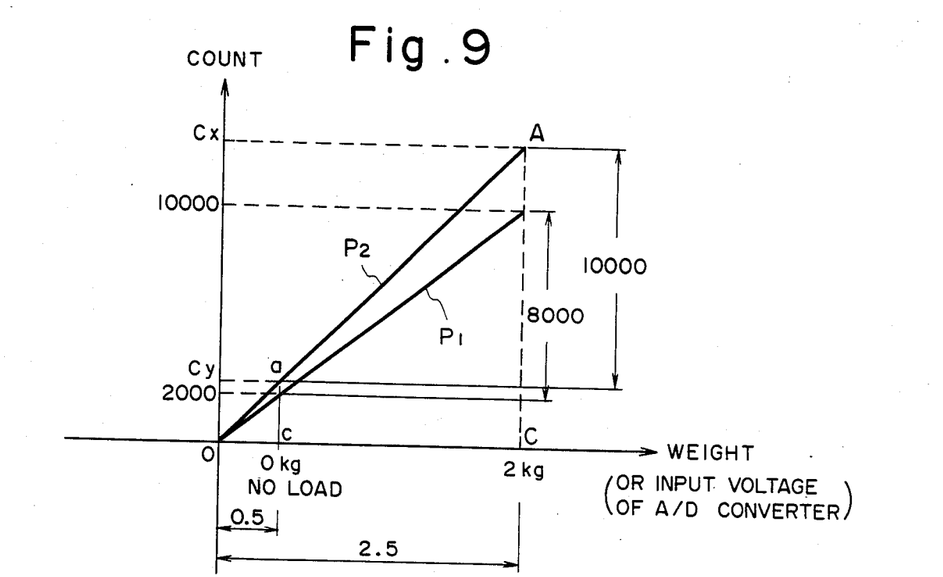
FIG. 9 is a diagram explanatory of the manner in which the span of an electric weighing apparatus or scale is adjusted.

It is assumed that the output value of the double-integrating A/D converter incorporated in the scale is 2000 counts at the time of no load, and 10,000 counts at the time a weight of 2 kg is placed on the scalepan, so that the scale has a span of 8000 counts, as indicated by the straight line P1 in FIG. 9. The operation time of the software-implemented timer at this time is T.

The span of this scale will be adjusted to 10,000 counts.

The operation time of the software-implemented timer capable of changing the span of the scale to 10,000 counts is set to Tx, and the output value of the double-integrating A/D converter is Cy counts at the time of no load, and Cx counts at the time a weight of 2 kg is placed on the scalepan, as indicated by the straight line P2 in FIG. 9. Since the following relation exists in FIG. 9, $$\text{Triangle AOC} \propto \text{triangle aOc} \quad (1)$$

an apparent weight placed on the scalepan at the origin (where the output value of the A/D converter is 0) of the illustrated coordinate system is $-0.5$ kg.

From the above formula (1), the following equations can be derived:

$$(2+0.5):Cx = 0.5:Cy$$

$$Cx:Cy = 10,000 \text{ counts}$$

By solving these simultaneous equations, $$Cx = 12,500 \text{ counts}$$

$$Cy = 2500 \text{ counts}$$

The operation times Tx and T of the software-implemented timer and the output counts at the time have the following proportionality relationship:

$$T:10,000 = Tx:12,500$$

Therefore, $$Tx = T \times (12500/10000) = 1.25T$$

Accordingly, the span of the scale can be adjusted to 10,000 counts by multiplying the operation time T of the software-implemented timer prior to the span adjustment by 1.25.

As a consequence, if the current operation time of the software-implemented timer, the output value of the A/D converter at the time of no load, and the output value of the A/D converter at the time a weight corresponding to a weighing capacity is placed on the scalepan are known, the operation time Tx of the software-implemented timer at the time a span adjustment is completed can be uniquely derived.

The abscissa of FIG. 9 is representative of weight values (or input voltages of the A/D converter) of articles to be placed on the scalepan, and the ordinate indicates output values of the A/D converter which are issued dependent on the placed weights.

Figure 10:
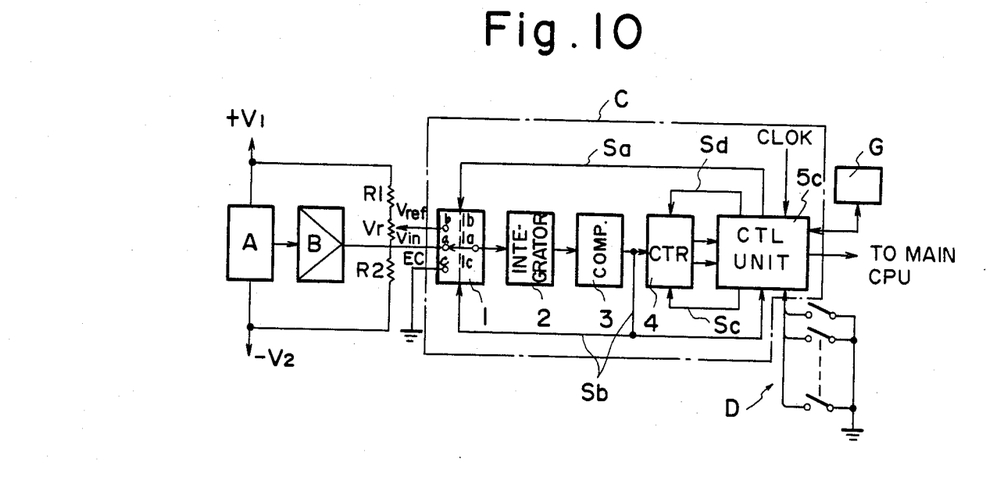
FIG. 10 is a block diagram of a span adjusting system according to still another embodiment of the present invention.

An electronic scale according to still another embodiment in which any span error due to the difference between gravitational accelerations on the earth can easily be corrected will now be described with reference to FIG. 10. In FIG. 10, an input means D comprises an area indicating means for indicating a geometrical area in which the scale is to be used from a plurality of geometrical areas divided according to different gravitational accelerations. The whole of Japan is divided into 16 geographical areas for scales having an accuracy of 1/3000 or higher.

Designated at G in FIG. 10 is a memory for storing operation times of the software-implemented timer which are calculated for the respective geometrical areas so that the span remains constant in each area. The stored operation times may comprise operation times of the software-implemented timer for the respective areas, or deviation times calculated from the operation times, that is, deviations of the operation times of the software-implemented timer for the respective areas from a reference operation time of the software-implemented timer for a particular area.

The following Table 1 shows the gravitational accelerations of 16 geographical areas of Japan, span deviations of a scale which has an accuracy of 1/3000, a weighing capacity of 3 kg and which is designed to produce 5 counts per 1 g, with the span in the first area being used as a reference, operation times of the software-implemented timer for the respective areas which can make the spans in the areas constant, and other data.

TABLE 1

| Area | Gravitational acceleration (m/s$^2$) | Span deviation (g) | Count corrs. to weighing capacity | Count deviation | Operation time = step |
|---|---|---|---|---|---|
| 1 | 9.806 | 0 | 15000 | 0 | 15000 |
| 2 | 9.805 | −0.306 | 14998 | 2 | 15002 |
| 3 | 9.804 | −0.612 | 14997 | −3 | 15003 |
| 4 | 9.803 | −0.918 | 14995 | −5 | 15005 |
| 5 | 9.802 | −1.224 | 14994 | −6 | 15006 |
| 6 | 9.801 | −1.530 | 14992 | −8 | 15008 |
| 7 | 9.800 | −1.836 | 14991 | −9 | 15009 |
| 8 | 9.799 | −2.143 | 14989 | −11 | 15011 |
| 9 | 9.798 | −2.449 | 14988 | −12 | 15012 |
| 10 | 9.797 | −2.755 | 14986 | −14 | 15014 |
| 11 | 9.796 | −3.061 | 14985 | −15 | 15015 |
| 12 | 9.795 | −3.367 | 14983 | −17 | 15017 |
| 13 | 9.794 | −3.673 | 14982 | −18 | 15018 |
| 14 | 9.793 | −3.980 | 14980 | −20 | 15020 |
| 15 | 9.792 | −4.286 | 14978 | −22 | 15022 |

TABLE 1-continued

| Area | Gravitational acceleration (m/s²) | Span deviation (g) | Count corrs. to weighing capacity | Count deviation | Operation time = step |
|---|---|---|---|---|---|
| 16 | 9.791 | −4.592 | 14977 | −23 | 15023 |

The numerical values indicated as the count corresponding to the weighing capacity are representative of spans of the A/D converter in the respective areas to which the scale, having its span adjusted in the first area, is transferred. The operation times of the software-implemented timer are those in the respective areas which can make the spans in the areas 15,000 counts.

The operation time of the software-implemented timer is such that the input voltage and reference voltage of the A/D converter C are adjusted to be equal at the time a weight corresponding to the weighing capacity is placed on the scalepan. The output value of the A/D converter C is adjusted one count by adjusting the operation time of the software-implemented timer by one step. The operation time is set to 15,000 steps in the first area, and to 15,023 steps in the sixteenth area to offset the difference between the output count from the A/D converter in the first area and that in the sixteenth area which is 23 steps fewer than the former at the time the weight corresponding to the weighing capacity is placed on the scalepan.

Figure 11:
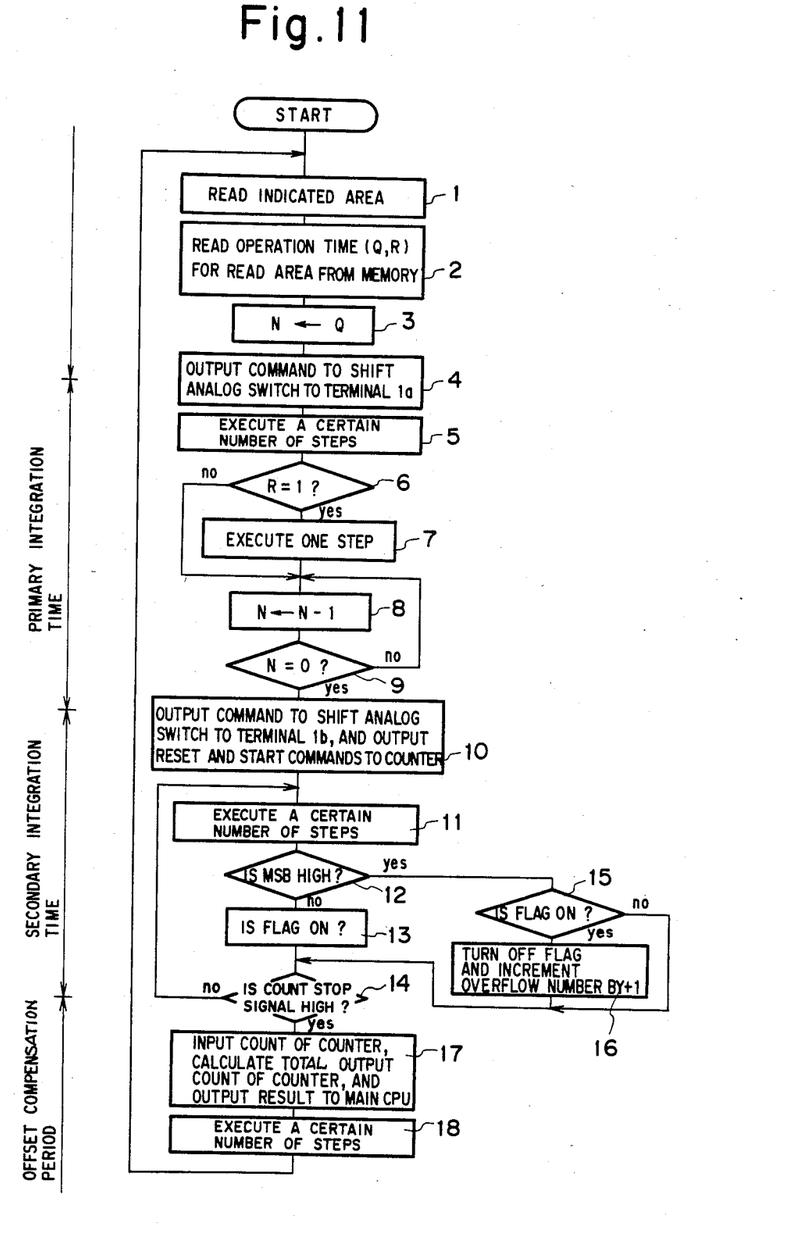
FIG. 11 is a flowchart of the operation of a double-integrating A/D converter in the span adjusting system shown in FIG. 10.

A control unit 5c has a control means for reading the operation time of the software-implemented timer indicated by the area indicating means D from the memory G and controlling the operation time of the software-implemented timer based on the read operation time (the control means achieving the functions by executing the steps of the flowchart of FIG. 11).

Operation of the system shown in FIG. 10 will be described with reference to FIG. 11.

For the sake of brevity, it is assumed that the reference voltage Vref of the A/D converter C and the input voltage Vin of the A/D converter C at the time a weight corresponding to to the weighing capacity is placed on the scalepan are equalized to each other by operating the variable resistor Vr, and the contact of the analog switch 1 is connected to the terminal 1c.

When the program is run, the control unit 5c reads an area of use preset by the area indicating means D and reads the operation time of the software-implemented timer from the memory G in steps 1 and 2. The operation time thus read may be 15,000 steps for the first area and 15,002 steps for the second area, or may be 2 steps for the first area and 4 steps for the second area as deviations from a reference that is 14,998 steps, which are required to be fixed, as described later, during the operation time of the software-implemented timer. With this process of using deviations, the adjustment of one step which is a minimum variable unit of the software-implemented timer can easily be adjusted. The remainder R and the level at the output terminal Q for effecting the above deviations determined from the following equation, and are stored in the memory E and will be read out.

Operation time (number of steps) = 14998 + 2Q + R

For 1st area (15000), Q = 1, R = 0
For 2nd area (15002), Q = 2, R = 0
For 3rd area (15003), Q = 2, R = 1
For 4th area (15005), Q = 3, R = 1

Operation time (number of steps) = 14998 + 2Q + R

...

For 16th area (15023), Q = 12, R = 1

As Q is thus read, the control unit 5c sets Q as a processing number N which requires 2 steps for one loop process in step 3, and then issues a command for shifting the contact of the analog switch 1 from the terminal 1c to the terminal 1a in step 4. The integrator 2 now starts a primary integration on an unknown input voltage.

The control unit 5c executes a process corresponding to 14,997 steps as a fixed operation time in step 5, and then determines whether R as read is 1 or not. If R is 1, then the control unit 5c executes the next step 7, and if R is 0, step 7 is skipped and the program goes to a next loop process. Thus, a process corresponding to a total of 14,998 steps is executed in steps 5 and 6.

Then, the control unit 5c repeats a process which requires two steps in one loop process N times. More specifically, the control unit 5c decrements N by 1 in step 8, and determines whether N is 0 or not in step 9. If N is not 0, the program returns to step 8. The above loop process is repeated until N is 0.

For example, since R=1 in the 16th area, a process of seven steps is executed and the loop process is repeated 12 times. Therefore, for the 16th area, a process of $$14,998 + 1 + 2 \times 12 = 15,023 \text{ steps}$$

is executed from step 5 through step 9.

After the steps corresponding to a prescribed operation time have been finished, the control unit 5c issues a command Sa to shift the contact of the analog switch 1 to the terminal 1b, and at the same time issues a command Sc for resetting and starting the counter 4 in step 10. The integration of the unknown voltage Vin is stopped, and an inverse integration of the reference voltage Vref and a counting operation by the counter 4 are started.

As the period of the inverse integration (secondary integration) begins, the control unit 5c checks whether the most significant bit (MSB) of the counter 4 is high or low in a period shorter than half of a period in which the counter 4 reaches its full count, and thus counts overflows of the counter 4.

More specifically, the control unit 5c gains time by executing a process composed of a number of steps in a step 11 and then checks whether the MSB is high or low in a next step 12. Since the MSB in the half of the period in which the counter 4 reaches its full count is low, the result of step 12 is NO, and a flag is ON in a next step 13. Then, the control unit 5c checks whether the count stop signal Sb from the comparator 3 is high or low in step 14. If the count stop signal is high as a consequence of checking, the program goes to a next step 17, and if the count stop signal is low the program returns to step 11. When the half of the period in which the counter 4 reaches its full count elapses and the MSB changes from the low state to the high state, when the above loop process is repeated, the program now goes from the step 12 to a step 15.

In the step 15, the control unit 5c determines whether the flag is ON or not. Since the flag is ON initially, it is rendered OFF in a succeeding step 16, and the number of overflows is incremented by +1, whereupon the program jumps to the step 14. Since the flag is OFF if the program goes back to the step 11 and proceeds from the step 12 to the step 15, the step 16 is now skipped during the half period in which the MSB is high, and the program jumps to the step 14.

The control unit 5c thus monitors the count stop signal Sb from the comparator 3 while counting overflows of the counter 4. When the count stop signal Sb is high, the inverse integration of the reference voltage Vref and the shifting of the contact to the terminal 1c are completed, and a total output count C of the counter 4 is calculated from the count of the counter 4 and the number of counted overflows in a step 17. The calculated result is then issued to the main CPU.

Then, a process composed of a certain number of steps is executed to gain time for effecting offset compensation of the integrator 2 in a step 18, and the program thereafter goes back to the step 1.

Accordingly, each primary integrating time is controlled on the basis of the operation time of the software-implemented timer for the area specified by the area indicating means D. With the embodiment shown in FIGS. 10 and 11, after the span of the scale has been adjusted to 15,000 in a first span adjustment effected with a weight corresponding to the weighing capacity of the scale being placed on the scalepan, the span can be adjusted to 15,000 counts in any desired area of use simply by causing the area indicating means D to indicate that desired area.

In the first span adjustment which is carried out with a weight corresponding to the weighing capacity being placed on the scalepan, however, the area indicating area D has to indicate the area in which the first span adjustment is effected.

Although certain preferred embodiments have been shown and described, it should be understood that many changes and modifications may be made therein without departing from the scope of the appended claims.

What is claimed is:

1. A system, for adjusting the span of an electronic scale, having a double-integrating A/D converter for converting a weight signal into a digital signal, said system comprising:
   a control unit, operatively connected to the double-integrating A/D converter, having a software-implemented timer for controlling a primary integrating time of the double-integrating A/D converter; and
   adjusting means, operatively connected to said control unit, for adjusting an operation time of said software-implemented timer.

2. A system according to claim 1, wherein said adjusting means comprises input means for entering said operation time as an input to said control unit.

3. A system, for adjusting the span of an electronic scale, having a double-integrated A/D converter for converting a weight signal into a digital signal, said system comprising:
   display means, operatively connected to the double-integrating A/D converter, for displaying a digital signal produced by the double-integrating A/D converter;
   a control unit, operatively connected to the double-integrating A/D converter, having a software-implemented timer for controlling a primary integrating time of the double-integrating A/D converter; and
   adjusting means, operatively connected to said control unit, for adjusting an operation time of said software-implemented timer.

4. A system, for adjusting the span of an electronic scale, having a double-integrating A/D converter for converting a weight signal into a digital signal, said system comprising:
   a control unit, operatively connectable to the double-integrating A/D converter, having a software-implemented timer for controlling an integrating time for integrating the weight signal;
   setting means, operatively connected to said control unit, for applying a signal to said software implemented timer to stepwise change an operation time from said software-implemented timer of said control unit; and
   a variable resistor, operatively connected to the double-integrating A/D converter, for continuously adjusting a reference voltage of the double-integrating A/D converter.

5. A system, for adjusting the span of an electronic scale, having a double-integrating A/D converter for converting a weight signal into a digital signal, said system comprising:
   a control unit, operatively connectable to the double-integrating A/D converter, having a software-implemented timer for controlling an integrating time for integrating the weight signal;
   setting means, operatively connected to said control unit, for applying a signal to said software implemented timer to stepwise change an operation time from said software-implemented timer of said control unit; and
   a variable resistor, operatively connected to the double-integrating A/D converter, for continuously adjusting an input voltage applied as the weight signal to the double-integrating A/D converter.

6. A system, for adjusting the span of an electronic scale, having a double-integrating A/D converter for converting a weight signal into a digital signal, said system comprising:
   a memory for storing a digital value indicative of the weight of a weight;
   a control unit including:
      a software-implemented timer, operatively connected to the double-integrating A/D converter, for controlling a primary integrating time of the double-integrating A/D converter; and
      adjusting means, operatively connected to said memory, the double-integrating A/D converter and said software implemented timer, for reading the digital value from said memory, comparing the read digital value with an output value from the double-integrating A/D converter at the time a weight is placed on a scalepan of the electronic scale, and adjusting an operation time of said software-implemented timer so that the compared values will be equal to each other; and
   a span command switch, operatively connected to said adjusting means, for commanding operation of said adjusting means.

7. A system, for adjusting the span of an electronic scale, having a double-integrating A/D converter for converting a weight signal into a digital signal, said system comprising:
   a sofware-implemented timer, operatively connectable to the double-integrating A/D converter, for controlling an integrating time for integrating an input signal;

a control unit, operatively connectable to the double-integrating A/D converter and to said software implemented timer, having control means for controlling an operation time of said software-implemented timer;

a memory, operatively connected to said software implemented timer, for storing operation times of said software-implemented timer corresponding to respective gravitational accelerations so that the span of the electronic scale remains constant; and area indicating means, operatively connected to said memory, for indicating areas corresponding to the operation times stored in said memory for the respective gravitational accelerations.

8. A system according to claim 7, wherein the operation times stored in said memory are deviations of the operation times of said software-implemented timer for the respective areas from the operation time of said software-implemented timer for a particular area.

9. A system according to claim 7, wherein a deviation time for an indicated area is added to or subtracted from the operation time of said software-implemented timer for a particular area, and the operation time of the software-implemented timer for an indicated area is controlled by the time to which the deviation time is added or from which the deviation time is subtracted.

10. A system for adjusting the span of an electronic scale, operatively connected to receive a weight signal, said system comprising:

a double-integrating A/D converter for integrating the weight signal;

a control unit, operatively connected to said double-integrating A/D converter, having a software implemented timer for controlling an integrating time for integrating the weight signal; and setting means, operatively connected to said control unit, for applying a signal to stepwise change an operation time of said software implemented timer.

11. A span adjusting system, operatively connected to receive a weight signal and a reference voltage, comprising:

a double-integrating A/D converter operatively connectable to receive the reference voltage;

a control unit, operatively connected to said double-integrating A/D converter, having a software-implemented timer for controlling an integrating time for integrating the weight signal;

setting means, operatively connected to said control unit, for applying a signal to stepwise change an operation time of said software implemented timer; and a variable resistor, operatively connected to said double-integrating A/D converter, for continuously adjusting the reference voltage of said double-integrating A/D converter.

* * * * *